(12) United States Patent
Swedek et al.

(10) Patent No.: US 8,858,298 B2
(45) Date of Patent: Oct. 14, 2014

(54) POLISHING PAD WITH TWO-SECTION WINDOW HAVING RECESS

(71) Applicant: Applied Materials, Inc., Santa Clara, CA (US)

(72) Inventors: Boguslaw A. Swedek, Cupertino, CA (US); Manoocher Birang, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 13/748,456

(22) Filed: Jan. 23, 2013

(65) Prior Publication Data

US 2013/0231032 A1    Sep. 5, 2013

Related U.S. Application Data

(63) Continuation of application No. 10/444,921, filed on May 23, 2003, now Pat. No. 8,485,862.

(60) Provisional application No. 60/398,632, filed on Jul. 24, 2002.

(51) Int. Cl.
| B24B 1/00 | (2006.01) |
| B24D 11/02 | (2006.01) |
| B24B 37/013 | (2012.01) |
| B24B 49/02 | (2006.01) |
| B24B 49/10 | (2006.01) |
| G01B 7/06 | (2006.01) |
| B24B 37/20 | (2012.01) |
| B24B 49/12 | (2006.01) |
| B24B 37/26 | (2012.01) |

(52) U.S. Cl.
CPC .............. *B24B 37/205* (2013.01); *B24B 37/013* (2013.01); *B24B 49/02* (2013.01); *B24B 49/105* (2013.01); *G01B 7/105* (2013.01); *B24B 49/12* (2013.01); *B24B 49/10* (2013.01); *B24B 37/26* (2013.01); *B24D 11/02* (2013.01)
USPC .............................................. 451/41; 451/527

(58) Field of Classification Search
USPC ............................ 451/41, 285–289, 526–534
See application file for complete search history.

(56) References Cited

U.S. PATENT DOCUMENTS

| 5,196,353 A | 3/1993 | Sandhu et al. |
| 5,257,478 A | 11/1993 | Hyde |

(Continued)

FOREIGN PATENT DOCUMENTS

| JP | 57-138575 | 8/1982 |
| JP | 60-037076 | 2/1985 |

(Continued)

OTHER PUBLICATIONS

Office Action from U.S. Appl. No. 11/842,829, dated Dec. 12, 2007, 7 pages.

(Continued)

*Primary Examiner* — Hadi Shakeri
(74) *Attorney, Agent, or Firm* — Fish & Richardson P.C.

(57) ABSTRACT

A method of forming a polishing pad with a polishing layer having a polishing surface and a back surface. A plurality of grooves are formed on the polishing surface, and an indentation is formed in the back surface of the polishing layer. A region on the polishing surface corresponding to the indentation in the back surface is free of grooves or has shallower grooves.

12 Claims, 4 Drawing Sheets

(56) References Cited

U.S. PATENT DOCUMENTS

| | | |
|---|---|---|
| 5,433,651 A | 7/1995 | Lustig |
| 5,489,233 A | 2/1996 | Cook |
| 5,605,760 A | 2/1997 | Roberts |
| 5,609,511 A | 3/1997 | Moriyama et al. |
| 5,838,447 A | 11/1998 | Hiyama |
| 5,893,796 A | 4/1999 | Birang et al. |
| 5,913,713 A | 6/1999 | Cheek et al. |
| 5,964,643 A | 10/1999 | Birang |
| 6,068,539 A | 5/2000 | Bajaj et al. |
| 6,071,178 A | 6/2000 | Baker, III |
| 6,179,709 B1 | 1/2001 | Redeker |
| 6,248,000 B1 | 6/2001 | Aiyer |
| 6,254,459 B1 * | 7/2001 | Bajaj et al. ............ 451/41 |
| 6,358,130 B1 | 3/2002 | Freeman et al. |
| 6,395,130 B1 | 5/2002 | Adams et al. |
| 6,428,386 B1 | 8/2002 | Bartlett |
| 6,433,541 B1 | 8/2002 | Lehman et al. |
| 6,458,014 B1 | 10/2002 | Ihsikawa et al. |
| 6,524,164 B1 | 2/2003 | Tolles |
| 6,575,825 B2 | 6/2003 | Tolles et al. |
| 6,586,337 B2 * | 7/2003 | Parikh ............ 438/692 |
| 6,599,765 B1 | 7/2003 | Boyd et al. |
| 6,641,470 B1 | 11/2003 | Zhao et al. |
| 6,685,537 B1 | 2/2004 | Fruitman et al. |
| 6,707,540 B1 * | 3/2004 | Lehman et al. ............ 356/72 |
| 6,832,949 B2 | 12/2004 | Konno et al. |
| 6,855,034 B2 * | 2/2005 | Hasegawa ............ 451/41 |
| 7,001,242 B2 | 2/2006 | Birang et al. |
| 7,001,246 B2 | 2/2006 | Hanawa et al. |
| 7,229,337 B2 | 6/2007 | Lim et al. |
| 7,229,340 B2 | 6/2007 | Hanawa et al. |
| 7,258,602 B2 | 8/2007 | Shih et al. |
| 7,374,477 B2 | 5/2008 | Birang et al. |
| 8,485,862 B2 | 7/2013 | Swedek et al. |
| 2002/0077031 A1 | 6/2002 | Johansson et al. |
| 2002/0090887 A1 | 7/2002 | Halley et al. |
| 2002/0115379 A1 | 8/2002 | Sevilla et al. |
| 2002/0173231 A1 | 11/2002 | Hasegawa |
| 2003/0236055 A1 | 12/2003 | Swedek et al. |
| 2005/0060943 A1 | 3/2005 | Turner |
| 2008/0003936 A1 | 1/2008 | Swedek et al. |

FOREIGN PATENT DOCUMENTS

| | | |
|---|---|---|
| JP | 3-234467 | 10/1991 |
| JP | 5-138531 | 6/1993 |
| JP | 5-309558 | 11/1993 |
| JP | 7-052032 | 2/1995 |
| JP | 9-036072 | 2/1997 |
| WO | WO 93/20976 | 10/1993 |
| WO | 01/89765 | 11/2001 |

OTHER PUBLICATIONS

Final Office Action from U.S. Appl. No. 11/842,829, dated May 5, 2008, 9 pages.

* cited by examiner

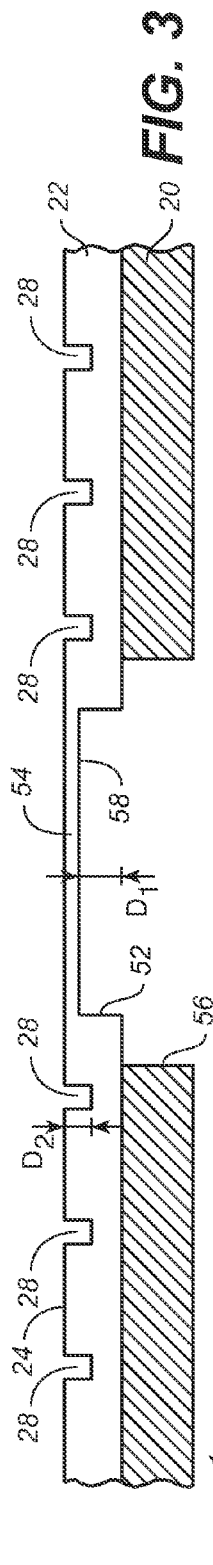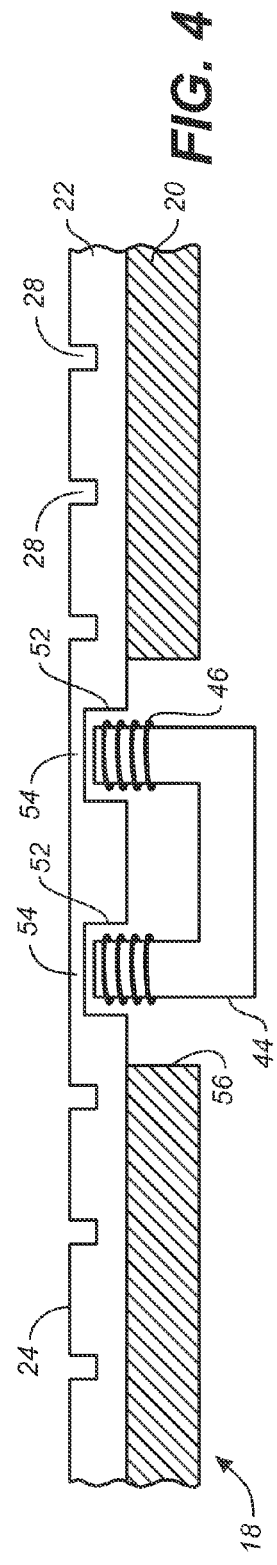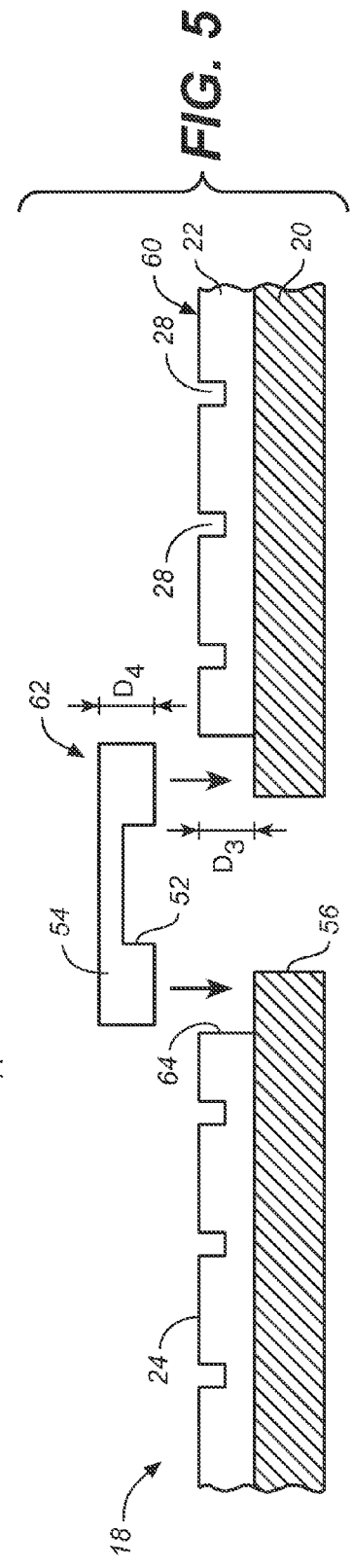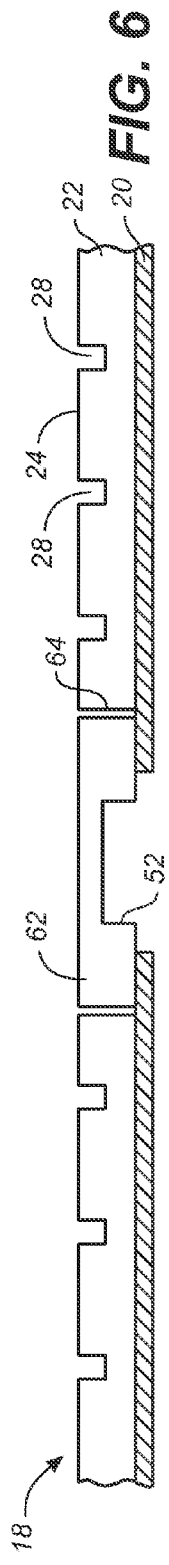

POLISHING PAD WITH TWO-SECTION WINDOW HAVING RECESS

CROSS-REFERENCE TO RELATED APPLICATIONS

This application is a continuation application of U.S. application Ser. No. 10/444,921, filed May 23, 2003, which claims benefit of U.S. Provisional Application Ser. No. 60/398,632, filed Jul. 24, 2002. The entirety of each of the above applications is incorporated herein by reference.

BACKGROUND

This present invention relates to polishing pads used in during chemical mechanical polishing and methods and apparatus for monitoring a polishing process.

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier or polishing head. The exposed surface of the substrate is placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment media. The carrier head provides a controllable load on the substrate to push it against the polishing pad. A polishing slurry, including at least one chemically-reactive agent, and abrasive particles if a standard pad is used, is supplied to the surface of the polishing pad.

One problem in CMP is determining whether the polishing process is complete, i.e., whether a substrate layer has been planarized to a desired flatness or thickness, or when a desired amount of material has been removed. Overpolishing (removing too much) of a conductive layer or film leads to increased circuit resistance. On the other hand, under-polishing (removing too little) of a conductive layer leads to electrical shorting. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the polishing endpoint. Therefore, the polishing endpoint cannot be determined merely as a function of polishing time.

One way to determine the polishing endpoint is to monitor polishing of the substrate in-situ, e.g., with optical or electrical sensors. One monitoring technique is to induce an eddy current in the metal layer with a magnetic field, and detect changes in the magnetic flux as the metal layer is removed. In brief, the magnetic flux generated by the eddy current is in opposite direction to the excitation flux lines. This magnetic flux is proportional to the eddy current, which is proportional to the resistance of the metal layer, which is proportional to the layer thickness. Thus, a change in the metal layer thickness results in a change in the flux produced by the eddy current. This change in flux induces a change in current in the primary coil, which can be measured as change in impedance. Consequently, a change in coil impedance reflects a change in the metal layer thickness.

SUMMARY

In one aspect, the invention is directed to a polishing pad. The polishing pad has a polishing layer having a front surface for polishing and a back surface. A first plurality of grooves are formed on the front surface of the polishing layer, and an indentation is formed in the back surface of the polishing layer. A region on the polishing surface corresponding to the indentation in the back surface is either free of grooves or has a second plurality of grooves that are shallower than the first plurality of grooves.

Implementations of the invention may include one or more of the following features. The region on the polishing surface corresponding to the indentation may be substantially flat, e.g., it may be free of grooves. Alternatively, the region on the polishing surface corresponding to the indentation may have the second plurality grooves. In addition, the region may be opaque or transparent. The polishing layer may be a unitary structure. The recess may be formed in a second portion of the polishing layer that is physically discrete from the first portion, and the second portion may be secure to the first portion. The first and second portions may have substantially the same material composition, and the second portion may have a top surface substantially flush with the polishing surface. An aperture may be formed in the first portion, and the second portion may be secured in the aperture. The second portion may have a top section with a first cross-sectional dimension and a bottom section with a second, different cross-sectional dimension. For example, the first cross-sectional dimension may be less than the second-cross-sectional dimension. The second plurality of grooves may extend past an inner surface of the indentation.

The pad may have a backing layer disposed on the back surface of the polishing layer. The backing layer may be softer than the polishing layer. The backing layer may have an aperture therethrough, and the aperture may be aligned with the indentation in the back surface of the polishing layer. The backing layer may be a thin non-compressible layer. The first plurality of grooves may be formed on a first portion of the polishing layer, and the recess may be formed in a second portion of the polishing layer that is physically discrete from the first portion. A second aperture may be formed in the polishing layer, and the second portion may be secured in the second aperture. The first aperture may have first cross-sectional dimension and the second aperture may have a second, different (e.g., larger or smaller) cross-sectional dimension.

In another aspect, the invention is directed to a polishing system. The polishing system has a carrier to hold a substrate, a polishing pad supported on the platen, and an eddy current monitoring system. The polishing pad includes a polishing layer having a front surface for polishing and a back surface, a first plurality of grooves formed in the front surface of the polishing layer, and an indentation formed in the back surface of the polishing layer. A region on the polishing surface corresponding to the indentation in the back surface is either free of grooves or has a second plurality of grooves that are shallower than the first plurality of grooves. The eddy current monitoring system has at least one of a coil and a core extending at least partially into the recess in the back surface of the polishing layer to monitor a metal layer on the substrate held by the carrier.

In another aspect, the invention is directed to a method of manufacturing a polishing pad. The method includes forming a first plurality of grooves in a polishing layer of the polishing pad, forming an indentation in a back surface of the polishing layer, and forming a region on the polishing surface corresponding to the indentation that is either free of grooves or has a second plurality of grooves that are shallower than the first plurality of grooves.

Implementations of the invention may include one or more of the following features. The polishing layer may be secured to a backing layer. Forming the recess may include machining the recess or molding the recess. Forming the indentation in the back surface may include securing a physically discrete first portion of the polishing pad having the indentation in an aperture in a second portion of the polishing pad having the grooves.

In another aspect, the invention is directed to a method of polishing. In the method, a substrate is brought into contact with a front surface of a polishing layer of a polishing pad, the polishing layer having a first plurality of grooves formed in a first portion of the front surface of the polishing layer and an indentation formed in a back surface of the polishing layer. A region on the polishing surface corresponding to the indentation in the back surface is either free of grooves or has a second plurality of grooves that are shallower than the first plurality of grooves. A polishing liquid is supplied to the front surface of the polishing layer, and relative motion is created between the substrate and the front surface.

Implementations of the invention may include one or more of the following features. A metal layer on the substrate may be monitored with an eddy current monitoring system that has at least one of a coil and a core extending at least partially into the recess in the back surface of the polishing layer.

In another aspect, the invention is directed to a polishing pad with a polishing layer having a front surface and a back surface. The front surface has a first portion with a plurality of grooves and a second portion that is substantially flat, and the back surface has a recess aligned with the second portion of the front surface.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a schematic cross-sectional side view illustrating the polishing pad of FIG. 2 along line 3-3.

FIG. 4 is a schematic cross-sectional side view illustrating a polishing pad having multiple indentations in the bottom surface of the covering layer.

FIG. 5 is schematic cross-sectional side view illustrating a polishing pad in which a grooveless insert is secured to a grooved polishing pad.

FIG. 6 is a schematic cross-sectional side view of another implementation of a polishing pad in which the backing layer is a thin sheet.

Like reference symbols in the various drawings indicate like elements.

DETAILED DESCRIPTION

Figure 1:
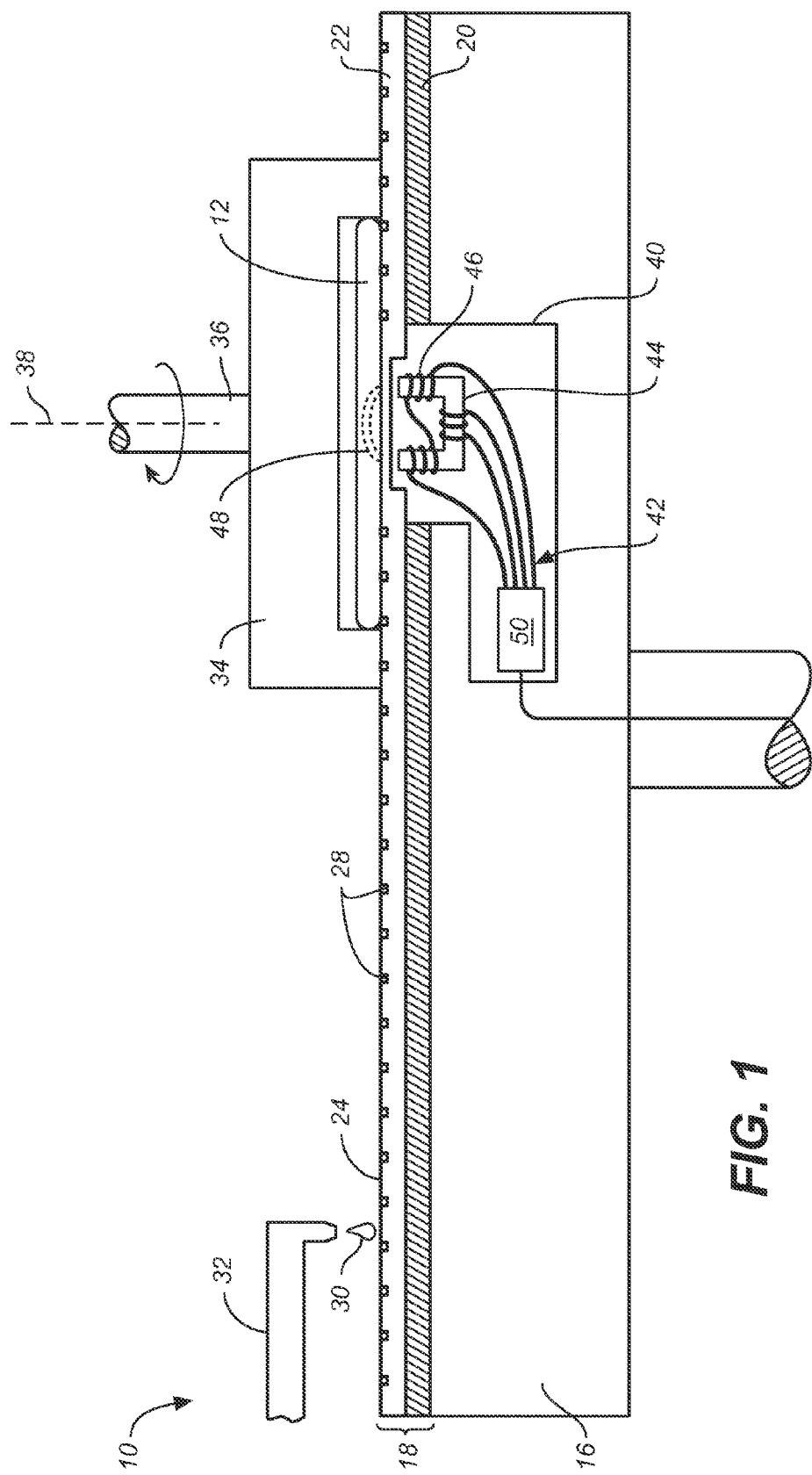
FIG. 1 is a schematic side view, partially cross-sectional, of a chemical mechanical polishing station that includes an eddy current monitoring system.

Referring to FIG. 1, one or more substrates 14 can be polished at a polishing station 10 of a CMP apparatus. A description of a suitable polishing apparatus can be found in U.S. Pat. No. 5,738,574, the entire disclosure of which is incorporated herein by reference.

The polishing station 10 includes a rotatable platen 16 on which is placed a polishing pad 18. The polishing pad 18 can be a two-layer polishing pad with a soft backing layer 20 and a hard durable outer layer 22 with a substantially uniform composition. The durable outer layer 22 provides a polishing surface 24. At least a portion of the polishing surface 24 can have grooves 28 for carrying slurry. The polishing station can also include a pad conditioner apparatus to maintain the condition of the polishing pad so that it will effectively polish substrates.

During a polishing step, a slurry 30 containing a liquid and a pH adjuster can be supplied to the surface of polishing pad 18 by a slurry supply port or combined slurry/rinse arm 32. Slurry 30 can also include abrasive particles.

The substrate 10 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38.

A recess 40 is formed in platen 16, and an in-situ monitoring module 42 fits into the recess 40. The in-situ monitoring module 42 can includes an situ eddy current monitoring system with a core 44 positioned in the recess 26 to rotate with the platen. Drive and sense coils 46 are wound the core 44 and are connected to a controller 50. In operation, an oscillator energizes the drive coil to generate an oscillating magnetic field 48 that extends through the body of core 44. At least a portion of magnetic field 48 extends through the polishing pad 18 toward the substrate 12. If a metal layer is present on the substrate 10, the oscillating magnetic field 48 will generate eddy currents. The eddy current produces a magnetic flux in the opposite direction to the induced field, and this magnetic flux induces a back current in the primary or sense coil in a direction opposite to the drive current. The resulting change in current can be measured as change in impedance of the coil. As the thickness of the metal layer changes, the resistance of the metal layer changes. Therefore, the strength of the eddy current and the magnetic flux induced by eddy current also change, resulting in a change to the impedance of the primary coil. By monitoring these changes, e.g., by measuring the amplitude of the coil current or the phase of the coil current with respect to the phase of the driving coil current, the eddy current sensor monitor can detect the change in thickness of the metal layer.

The drive system and sense system for the eddy current monitoring system will not be described in detail, as descriptions of suitable systems can be found in U.S. patent application Ser. Nos. 09/574,008, 09/847,867, and 09/918,591, filed Feb. 16, 2000, May 2, 2001, and Jul. 27, 2001, respectively, the entire disclosures of which are incorporated by reference.

Various electrical components of the eddy-current monitoring systems can be located on a printed circuit board in the controller 50. The controller can include circuitry, such as a general purpose microprocessor or an application-specific integrated circuit, to convert the signals from the eddy current sensing system into digital data.

As previously noted, the monitoring system 42 includes a core 44 positioned in the recess 26.

Figure 2:
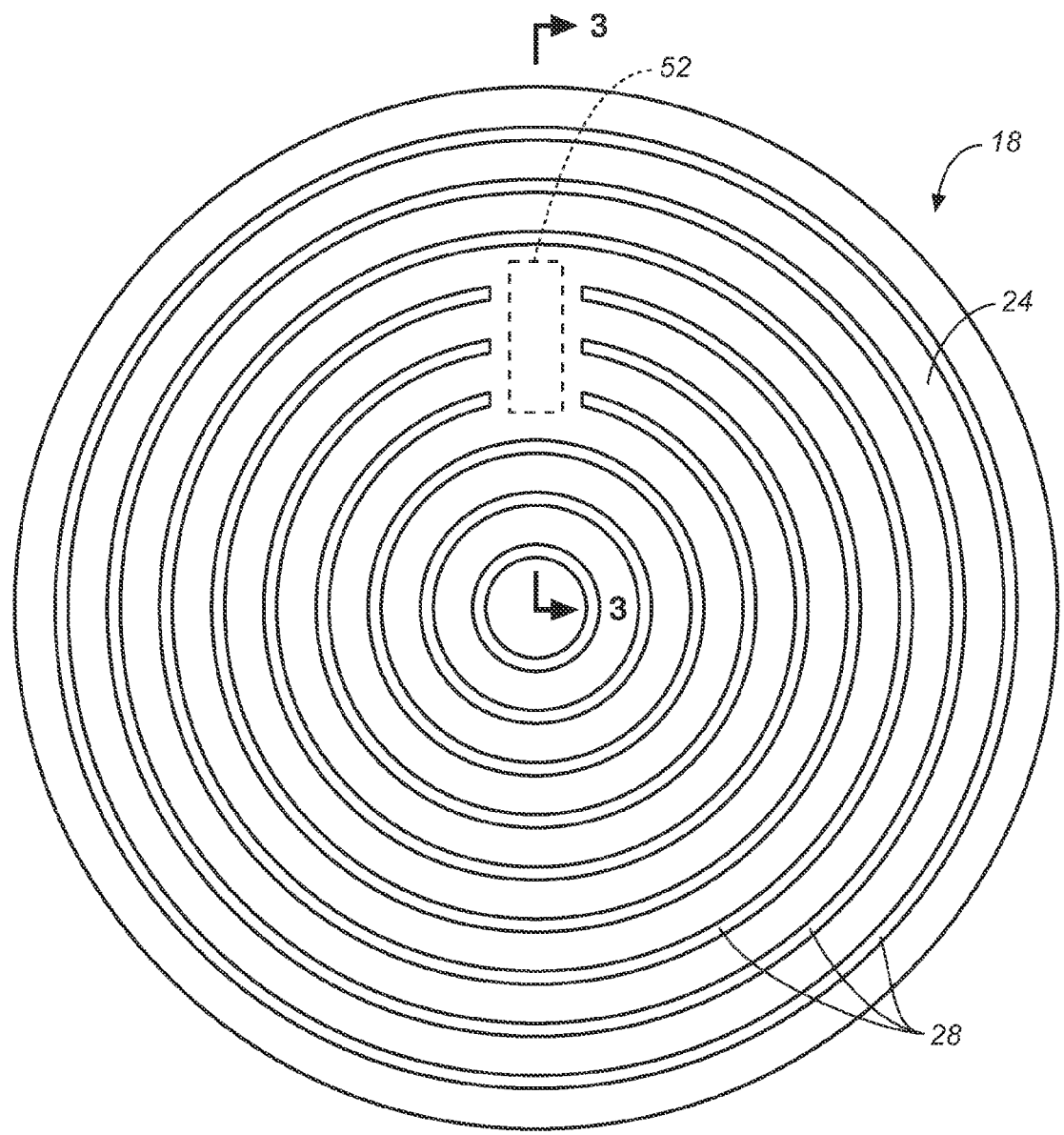
FIG. 2 is a schematic top view illustrating the polishing pad of FIG. 1.

Referring to FIGS. 2 and 3, the covering layer 22 of the polishing pad 18 includes one or more recesses or indentations 52 formed in the bottom surface of the covering layer. These indentations create one or more thin sections 54 in the covering layer of the polishing pad. The core 44 and/or coils 46 can extend into the indentations 52 so that they pass partially through the polishing pad. By positioning the core or coils close to the substrate, the spatial resolution of the eddy current monitoring system can be improved. These recesses 52 can extend through at least 50% of the thickness of the covering layer 22, e.g., through 75-80%. For example, in a polishing pad having an covering layer 22 that is 100 mils thick, the recess 52 can have a depth D1 of about 80 mils, leaving the thin section 54 with a thickness of about 20 mils.

As previously mentioned, the covering layer 22 can also include a plurality of grooves 28 formed therein. The grooves may be of nearly any pattern, such as concentric circles, straight lines, spirals, and the like. However, the grooves do not extend over the thin section 54 in the covering layer 22. Thus, the polishing surface 24 of the polishing pad includes portions with and without grooves, and the indentation is located in one of the portions without grooves. The grooves 28 can be at least 10 mils deep, e.g., about 20 mils deep. The grooves 28 can extend through about 20-25% of the thickness of the covering layer 22. For example, in a polishing pad having an covering layer 22 that is 80 mils thick, the grooves 28 can have a depth D2 of about 20 mils. The grooves can be sufficiently deep that they extend to or past the plane defined by the inner surface 58 of the recess.

In addition, the backing layer 20, if present, includes one or more apertures 56 positioned to provide access of the core 44 and/or coils 46 to the indentations 52. Thus, the core 44 and/or coils 46 can also extend through the backing layer 20. As illustrated in FIG. 2, a single aperture 52 can extend across all of the indentations 52. However, as illustrated in FIG. 4, in another implementation there is one aperture 56 aligned with each recess 52. However, for some polishing operations, only a single-layer polishing pad is used, and there is not backing layer.

Referring to FIGS. 1 and 4, when the polishing pad 18 is secured to the platen, the thin section 54 fits over the recess 26 in the plate and over a portion of the core and/or coil that projects beyond the plane of the top surface of the platen 16. By positioning the core 42 closer to the substrate, there is less spread of the magnetic fields, and spatial resolution can be improved. Assuming that the polishing pad is not being used with an optical endpoint monitoring system, then the entire polishing layer, including the portion over the recess, can be opaque.

In one implementation (shown in FIG. 3), the covering layer 22 can be manufactured, e.g., by a molding process, with grooves and recesses preformed in the upper and lower surfaces of the covering layer, respectively. Thus, the cover layer 22, including the grooved portion and the thin section, can be a single unitary body. The covering layer 22 can be manufactured by a molding process, e.g., by injection molding or compression molding, so that the pad material cures or sets in mold with indentations that form the grooves recess. Alternatively, the covering layer 22 can be manufactured by a more conventional technique, e.g., by scything a thin sheet of pad material from a block. The grooves and recess can then be formed by machining or milling the top and bottom surfaces of the covering layer, respectively. Once the covering layer 22 has been manufactured, it can then be secured to the backing layer 20, e.g., with an adhesive, with the recess 52 in the covering layer 22 aligned with the aperture 56 in the backing layer 20.

Alternatively, as shown in FIG. 5, the polishing pad can be manufactured in two parts. For example, the main body 60 of the pad can be manufactured with grooves 28 (either by molding or machining). A grooveless insert 62 having the recess 52 in its bottom surface can be manufactured separately. The main portion 60 and the insert 62 can be formed from the same material. An aperture 64 is cut in the main portion 60 of the covering layer 22, and the insert 64 is secured in the aperture 64, e.g., by an adhesive that bonds the insert 64 to the upper surface of the backing layer 20. The thickness $D_4$ of the insert 62 can be equal to the thickness $D_3$ of the covering layer 22, so that the top surface of the insert 62 is flush with respect to the polishing surface 24, or the thickness $D_4$ of the insert 62 can be slightly less than the thickness $D_3$ of the covering layer 22, so that the top surface of the insert 62 is slightly recessed with respect to the polishing surface 24.

In another implementation, illustrated in FIG. 6, the backing layer 20 is a thin sheet of non-compressible, tear-resistant material, such as Mylar (this implementation could be considered to function as a single-layer polishing pad). The Mylar sheet can be applied to the back of the covering layer 22, and then the insert 62 can be placed into the aperture 64 in the covering layer 22 and adhesively secured to the top surface of the Mylar sheet 20. A portion of the Mylar sheet is then removed to expose the recess 52.

Figure 7A:
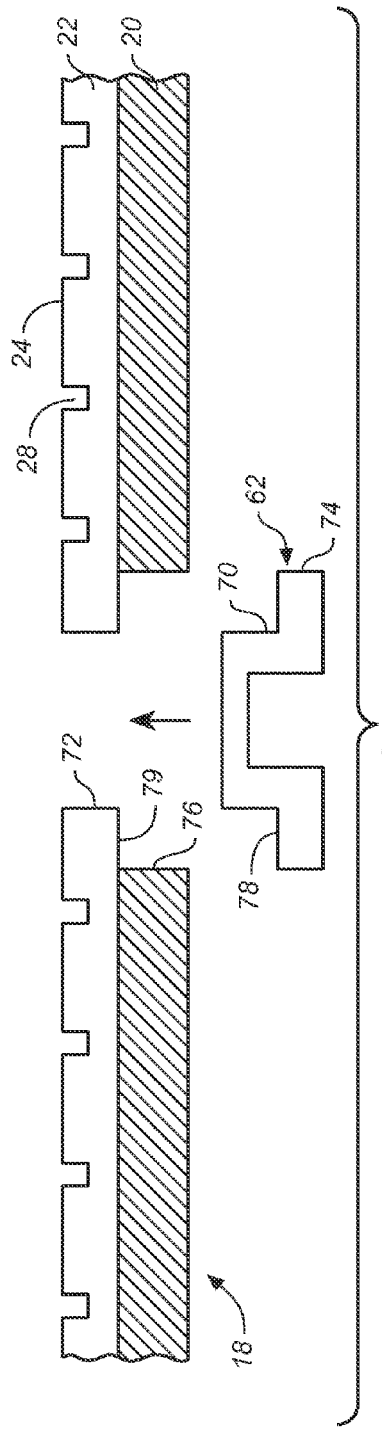
FIGS. 7A and 7B are schematic cross-sectional side views of another implementation of a polishing pad in which an insert is secured to a bottom surface of the covering layer.

In another implementation, illustrated in FIG. 7A, the insert 62 is secured to the underside of the covering layer 22. In this implementation, the insert 62 includes a narrow upper portion 70 that fits into an aperture 72 in the covering layer 22, and a wide lower portion 74 that fits into an aperture 76 in the backing layer 20. The top surface 78 of the wide portion 74 can be adhesively secured to the bottom surface 79 of the portion of the covering layer 22 that projects beyond the backing layer 20. The upper portion 70 can have the same thickness as the covering layer 22 so that the top surface of the insert is flush with the polishing surface 24, whereas the lower portion 74 can be thinner than the backing layer 20 to provide a gap between the platen and the insert.

Figure 7B:
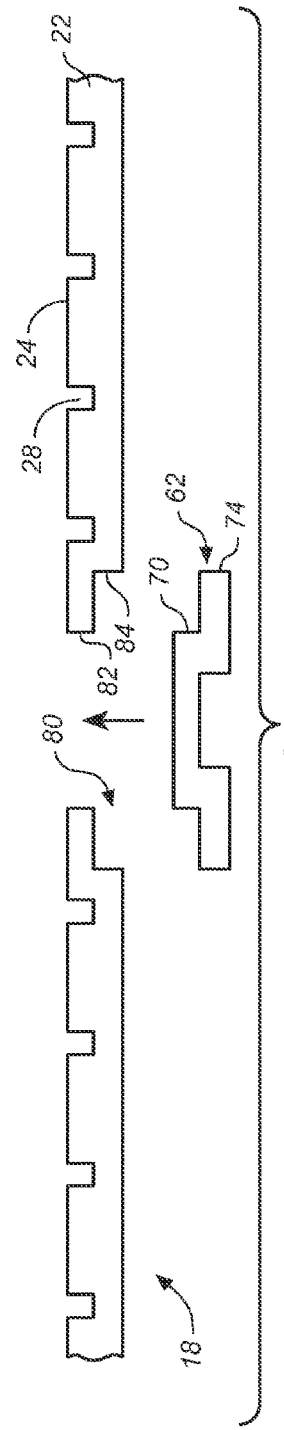

Referring to FIG. 7B, a two-part insert can also be secured to a single layer polishing pad. In this implementation, a two-part aperture 80 with an upper section 82 and a lower section 84 of different cross-sectional dimensions is formed in the covering layer 22. Assuming that the covering layer and insert have the same rigidity, the lower portion 74 can have the same thickness as the lower section 84 of the aperture.

Figure 8:
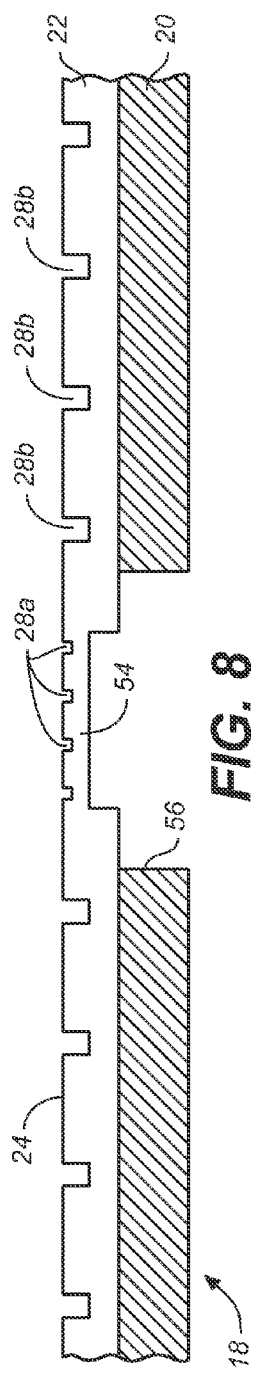
FIG. 8 is a schematic cross-sectional side view illustrating a polishing pad having shallow grooves over the recess.

Referring to FIG. 8, in another implementation, the portion of the polishing surface 24 corresponding to the recess 52, i.e., the thin section 54, can have very shallow grooves 28a, whereas the remainder of the polishing surface can have deep grooves 28b. The deep grooves 28b can be at least 10 mils deep, e.g., about 20 mils deep. In contrast, the shallow grooves 28a must have a depth that is less than (e.g., less than 25% of) the thickness of the thin section 54. For example, if the thin section 52 has a thickness of 20 mils, the shallow grooves 28a can have a depth of about 5 mils.

The eddy current monitoring system can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. The polishing pad can be a standard (e.g., polyurethane with or without fillers) rough pad, a soft pad, or a fixed-abrasive pad.

In addition, although terms of vertical positioning are used, it should be understood that the polishing surface and substrate could be held upside down, in a vertical orientation, or in some other orientation.

The eddy current monitoring system can include separate drive and sense coils, or a single combined drive and sense coil. In a single coil system, both the oscillator and the sense capacitor (and other sensor circuitry) are connected to the same coil.

A number of embodiments of the invention have been described. Nevertheless, it will be understood that various modifications may be made without departing from the spirit and scope of the invention. Accordingly, other embodiments are within the scope of the following claims.

What is claimed is:

1. A polishing pad, comprising:
   a polishing article having a polishing surface and a bottom surface, an aperture formed through the polishing article from the polishing surface to the bottom surface, the aperture having a first portion adjacent the polishing surface with a first cross-sectional width and a second portion adjacent the bottom surface with a second cross-sectional width greater than the first cross-sectional width such that a projecting section of the polishing article extends over the second portion of the aperture; and
   a transparent body secured in the aperture, the transparent body including a first section positioned in the first portion of the aperture and a second section positioned in the second portion of the aperture, an upper surface of the second section adhesively secured to a lower surface of the projecting section, the transparent body including a recess formed in an underside of the second section, the recess having a cross-sectional width less than the first cross-sectional width of the first portion of the aperture, the recess extending upwardly from the underside of the second section past the upper surface of the second section and into the first section, the transparent body configured such that a top surface of the first section is held substantially fixed relative to the polishing surface.

2. The polishing pad of claim 1, wherein the top surface of the first section of the transparent body is substantially coplanar with the polishing surface.

3. The polishing pad of claim 1, wherein the second section of the transparent body has a thickness substantially equal to a depth of the second portion of the aperture.

4. The polishing pad of claim 1, wherein the second section of the transparent body has a thickness less than a depth of the second portion of the aperture.

5. The polishing pad of claim 1, wherein the polishing article comprises a polishing layer having the polishing surface and a backing layer having the bottom surface.

6. The polishing pad of claim 5, wherein the first portion of the aperture is formed in the polishing layer and the second portion of the aperture is formed in the backing layer.

7. The polishing pad of claim 6, wherein the upper surface of the second section is adhesively secured to a back surface of the polishing layer.

8. The polishing pad of claim 5, wherein first section of the transparent body has the same cross-sectional width as the first portion of the aperture.

9. The polishing pad of claim 8, wherein the second section of the transparent body has the same cross-sectional width as the second portion of the aperture.

10. The polishing pad of claim 5, wherein the backing layer is softer than the polishing layer.

11. The polishing pad of claim 1, comprising a plurality of grooves formed in the polishing surface, wherein the grooves are shallower than the first portion of the aperture.

12. The polishing pad of claim 11, wherein the top surface of the transparent body is free of grooves.

* * * * *